UNITED STATES PATENT OFFICE.

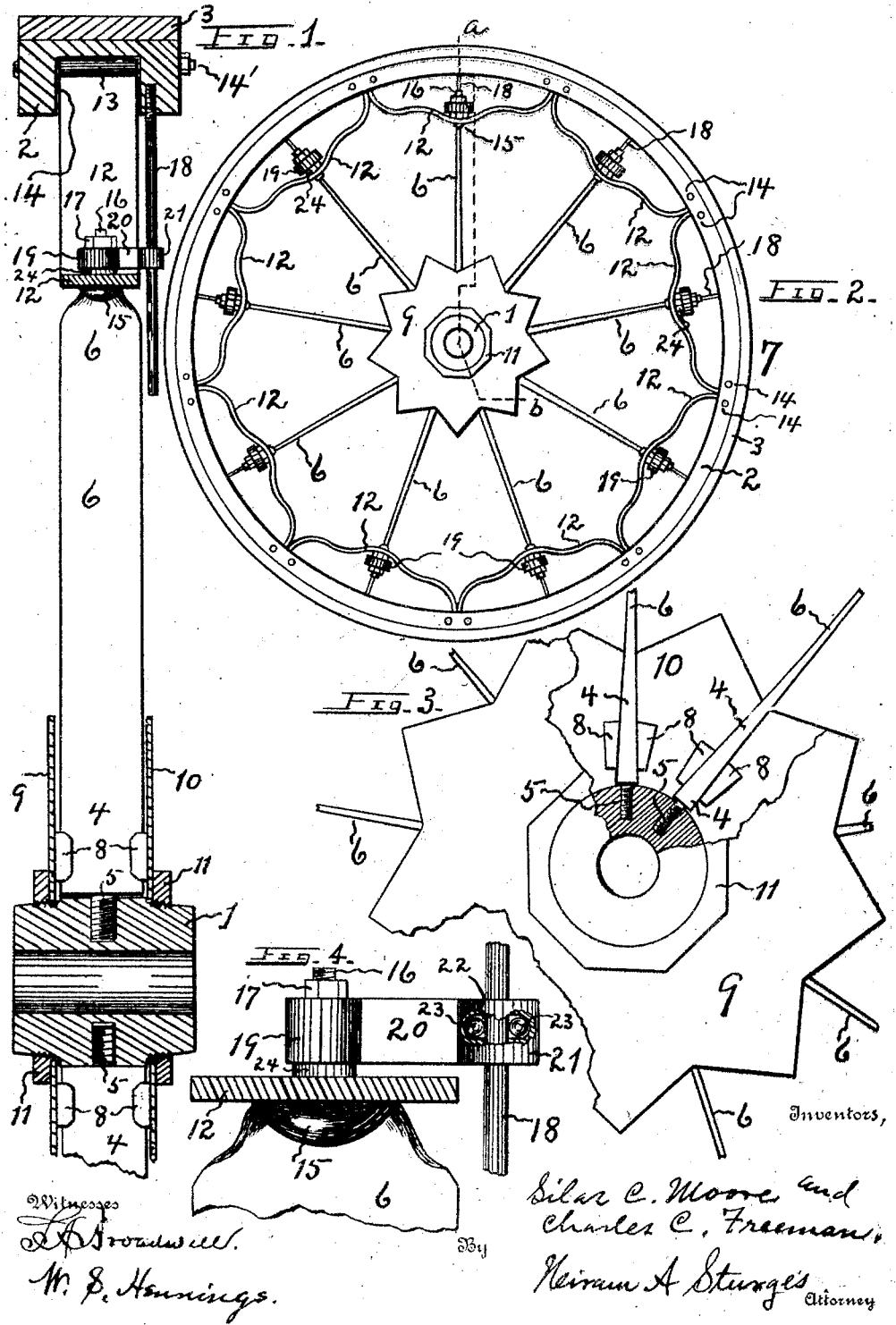

SILAS C. MOORE AND CHARLES C. FREEMAN, OF OMAHA, NEBRASKA.

VEHICLE-WHEEL.

No. 868,682.

Specification of Letters Patent.

Patented Oct. 22, 1907.

Application filed March 1, 1907. Serial No. 360,115.

*To all whom it may concern:*

Be it known that SILAS C. MOORE and CHARLES C. FREEMAN, citizens of the United States, residing at Omaha, in the county of Douglas and State of Nebraska, have invented certain new and useful Improvements in Vehicle-Wheels, of which the following is a specification.

This invention relates to improvements in vehicle wheels, of the class particularly adapted for use upon automobiles, and has for its object the presentation of means for preventing vibration of the axle when passing over obstructions, and thereby to dispense with the air-cushion tire.

The invention includes the use of a series of springs preferably of metal formed somewhat like an archer's bow secured end-to-end within an annular groove formed in the inner face of the tire, each bow spring being connected midway of its length to a radially-disposed spring-spoke, thereby sustaining the entire weight of the vehicle upon these springs, for the purposes named.

The invention has reference to the employment of metal spokes formed as thin plates or blades preferably tapered toward their outer ends and adapted to have a springing movement in directions radial to the wheel from force communicated from external sources, as the sudden stop-or-start movement of the vehicle or the passage over obstructions, at which time the springing movement of the spokes conduces to the resilient movement of the bow-springs.

It is considered that the invention may be economically constructed, and the mounting of the parts is such that any single part may be readily removed, if desired, without dismembering the wheel, and certain devices are therefore shown which we consider the best construction, for this purpose, and for the convenient assemblage of the parts.

The invention consists of the arrangement and combination of parts fully described herein and in the appended claims, and illustrated in the drawing, wherein,—

Figure 1 represents a vertical face view of one of the series of blade-spokes, as on line *a b* of Fig. 2 looking to the left; also showing the tire, hub and spoke-engaging-plates in section, as on said line *a b*, and showing the inner face of a part of a bow-spring and pivotal mounting of the latter in the tire; this figure also illustrates the preferred construction of devices to preserve the alinement of the spokes within the vertical plane of the bow-springs. Fig. 2 is a vertical side view of a vehicle wheel constructed according to our invention. Fig. 3 is a broken-away figure to illustrate the mounting of spokes in the hub and between the engaging-plates. Fig. 4 is a detail relating to Figs. 1 and 2, to show ball-housing guide-arm for the alining Referring now to the drawing for a more particular description, the numeral 1 indicates the hub and 2 the tire of a vehicle, 3 indicating an outer covering for the tire. We employ radially-disposed spokes 4 preferably having shanks 5 with threaded connections for their seatings in the hub; these spokes are formed outwardly tapering to provide comparatively thin but broad and resilient blade-spokes 6, their broad faces being presented at right angles to the plane of wheel 7, and in order that they may be thus positioned at all times we employ oppositely-disposed lugs 8 formed in pairs upon the inner faces of the vertically-disposed spoke-engaging plates 9 and 10, and as each spoke has a seating between each pair of lugs 8 upon plates 9 and 10, any vibration of the wheel or possible loosening of the threaded parts 5 will not cause any turning of these spokes. Plates 9 and 10 are held to their normal position closely adjacent to the spokes by means of screw-rings 11 upon the hub.

We employ a series of resilient springs 12 preferably of metal, and formed substantially as an archer's bow presented within the plane of the wheel, and having their ends 13 preferably coiled about and secured by pins 14', the latter transversely traversing tire 2 and the annular recess or groove 14' formed in the inner face of tire 2. As thus constructed and mounted springs 12 have a normal position substantially as shown in Fig. 2 equally distanced from the hub or center of the wheel, and are adapted to have a spring-like movement toward the tire or toward the hub from any sufficient engaging force applied to said springs.

The outer ends of spokes 6 are formed with heads 15 adapted to have a bearing upon, substantially, the center of springs 12, and are each formed with an outwardly-extending part as pins 16, and it will be understood that each spring 12 is secured upon one of pins 16 upon the end of each spoke 6, as by nut 17, the latter also securing other parts presently to be explained. Since the innermost part or the middle of each spring 12 is secured to a spoke 6, as described, it is evident that a downward movement of the hub will cause springs 12 upon the lower part of the wheel to be contracted in a direction toward the tire, at which time springs 12 at the upper part of the wheel will be drawn or extended in a direction from the tire, and therefore any sudden vibration of said wheel, as when passing over an obstruction, will be largely prevented. The hub, according to this construction is "suspended" or held at all times at or immediately below the center of the wheel, and sudden or excessive shocks or vibrations will be first received upon the springs, thereby preventing or reducing vibration of the hub. It will be noted that springs 12 located 90 degrees from the extreme upper and lower parts of the wheel will have a certain degree of movement in common with other springs 12; and if spokes 6 were constructed non-resilient, their rigidity would largely prevent this effect; therefore, spokes 6 are formed as plates having a degree of attenuity sufficient to permit them to bend at this time. In order that spokes 6 may be held within the vertical plane of springs 12, alining rods 18 are secured upon the inner face of tire 2 and one of these rods passes closely adjacent to each spring 12, and is extended inwardly of the wheel in a manner to pass adjacent to and parallel with a part of the outer end of each of spokes 6.

Upon each pin 16 is mounted the end 19 of guide-arm 20, the outer end 21 of the latter being provided with an inner, annular chamber 22 adapted to contain balls 23, said balls contacting with rod 18. Guides 20 are held rigidly adjacent to the inner face of springs 12 by means of nuts 17, already mentioned, and washers 24 are preferably used between each end 19 of the guide-arms and springs 12 so that guides 20 will not make contact with these springs; as thus arranged, rods 18 are disposed radially and extend a part of the length of spokes 6; and in operation arms 20 pass inwardly and outwardly of the wheel when the vehicle passes over uneven surfaces or obstructions, rods 18 tending to preserve a vertical alinement of the spokes and springs 12, and this feature is considered especially useful when driving at any considerable speed. Springs 12 would operate, of course, to prevent vibration of the hub, to a certain extent, whether or not spokes 6 were resilient, but such is not considered the best construction.
Heavy or light weight springs 12 may be used according to the uses required for the wheel, and it is considered best that springs 6 should be correspondingly varied in degree of attenuity.

It will be noted that shanks 5 of the spokes are protected from severe strains; lugs 8 provide a reliable holding means for the spokes at points between the threaded seatings of these spokes in the hub and their resilient outer ends, thereby in a large measure protecting the threaded ends from breakage.

What we claim as our invention is,—

1. A vehicle wheel comprising a hub; a tire having an annular groove formed within its inner wall; a series of radially-disposed spokes secured upon the hub and extending a part of the distance between the hub and tire; a series of bow-shaped springs secured end-to-end within said annular groove of the tire and extended within the plane of the wheel to a seating upon said radially-disposed spokes.

2. A vehicle wheel comprising a hub; a tire having an annular groove formed within its inner wall; a series of resiliently-formed radially-disposed spokes secured upon the hub and extending a part of the distance between the hub and tire; a series of bow-shaped springs secured end-to-end within said annular groove of the tire and extended within the plane of the wheel to a seating upon said resiliently-formed, radially-disposed spokes.

3. In combination, a vehicle wheel as described, comprising a hub; a tire having an annular groove formed in its inner wall; radially-disposed spokes secured upon the hub, each of said radially-disposed spokes formed outwardly tapering and having a terminal end between the hub and tire; bow-shaped springs having their ends secured in the annular groove of the tire and extended within the plane of the wheel to a seating upon the terminal ends of said radially-disposed spokes; guides secured centrally upon said bow-shaped springs; radially-disposed alining-rods secured upon the tire and extended within the plane of the wheel to a contact with said guides upon said bow-shaped springs, and passing beyond the terminal ends of said radially-disposed spokes.

In testimony whereof we have affixed our signatures in presence of two witnesses.

SILAS C. MOORE.
CHARLES C. FREEMAN.

Witnesses:
R. E. HIGGINS,
JAMES RHODES.